(12) United States Patent
Sheikman et al.

(10) Patent No.: US 8,659,392 B2
(45) Date of Patent: Feb. 25, 2014

(54) SYSTEM AND METHOD FOR DETERMINING THE LOCATION OF WIRELESS SENSORS

(75) Inventors: Boris Leonid Sheikman, Minden, NV (US); Raymond Verle Jensen, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 367 days.

(21) Appl. No.: 12/887,806

(22) Filed: Sep. 22, 2010

(65) Prior Publication Data

US 2012/0068822 A1 Mar. 22, 2012

(51) Int. Cl.
*G08B 5/22* (2006.01)
*H04Q 1/30* (2006.01)

(52) U.S. Cl.
USPC .......... 340/7.2; 340/7.1; 340/311.2; 340/7.21; 340/8.1

(58) Field of Classification Search
USPC .................. 340/7.1, 7.2, 311.2, 7.21, 825.49; 455/456.1, 41.2; 370/338
See application file for complete search history.

(56) References Cited

U.S. PATENT DOCUMENTS

| | | |
|---|---|---|
| 5,588,038 A | 12/1996 | Snyder |
| 6,776,334 B1 | 8/2004 | Garg |
| 7,035,818 B1 | 4/2006 | Bandy et al. |
| 7,133,909 B2 | 11/2006 | Bahl |
| 2003/0117316 A1 | 6/2003 | Tischer |
| 2007/0152813 A1 | 7/2007 | Mathur et al. |
| 2007/0171051 A1* | 7/2007 | Kashiwagi et al. ...... 340/539.22 |
| 2008/0211677 A1* | 9/2008 | Shecter ...................... 340/573.1 |
| 2009/0045939 A1* | 2/2009 | Holland et al. ............... 340/524 |
| 2010/0026514 A1 | 2/2010 | Becker |
| 2011/0084841 A1* | 4/2011 | Gyorfi et al. ................ 340/572.4 |
| 2011/0191135 A1* | 8/2011 | Williams et al. ............. 705/7.13 |
| 2012/0015665 A1* | 1/2012 | Farley et al. ................ 455/456.1 |
| 2012/0083289 A1* | 4/2012 | Li et al. ....................... 455/456.1 |

* cited by examiner

*Primary Examiner* — Hoi Lau
(74) *Attorney, Agent, or Firm* — Fletcher Yoder, P.C.

(57) ABSTRACT

A system and method for determining the location of wireless sensors are disclosed. The system may generally include a plurality of wireless sensor nodes communicatively coupled to a plurality of sensing devices. Additionally, the system may include a paging device configured to wirelessly transmit a page command to at least one of the wireless sensor nodes. Further, the at least one wireless sensor node may be configured to produce a position indicator upon receipt of the page command.

18 Claims, 3 Drawing Sheets

US 8,659,392 B2

SYSTEM AND METHOD FOR DETERMINING THE LOCATION OF WIRELESS SENSORS

FIELD OF THE INVENTION

The present subject matter relates generally to wireless devices and, more particularly, to a system and method for locating wireless sensors.

BACKGROUND OF THE INVENTION

Devices, such as probes, sensors transducers, cameras and the like, are used across a wide range of industries to monitor the operating conditions of industrial assets. For example, an industrial facility may include any number of essential assets, such as various types of machinery, and a plurality of supporting assets, such as pumps, motors, blowers, heat exchangers, fans and similar assets, that impact the process flowing through the essential assets. Such essential and/or supporting assets are often communicatively coupled to a variety of different devices to measure and/or sense the vibration, temperature, pressure, relative position and other operating parameters of the assets to ensure their proper operation and to appropriately schedule maintenance work.

To decrease the costs of installing sensing devices throughout a large industrial facility, the devices are often configured as wireless sensors that permit data captured by the sensing devices to be wirelessly transmitted to a central server for subsequent analysis. However, once installed within an industrial facility, it is often the case that the exact location of each wireless sensor is forgotten, misplaced and/or difficult to obtain. This is particularly true with regard to very large industrial facilities that may include hundreds or even thousands of wireless sensors dispersed throughout the facility. As such, when one or more of the wireless sensors need to be serviced or otherwise located, a substantial amount of time and money can be wasted attempting to find each particular wireless sensor.

Accordingly, a system that provides for the efficient determination of the location of wireless sensors would be welcomed.

BRIEF DESCRIPTION OF THE INVENTION

Aspects and advantages of the invention will be set forth in part in the following description, or may be obvious from the description, or may be learned through practice of the invention.

In one aspect, the present subject matter discloses a system for determining the location of wireless sensors. The system may generally include a plurality of wireless sensor nodes, with at least one of the wireless sensor nodes being communicatively coupled to at least one of a plurality of sensing devices. Additionally, the system may include a paging device configured to wirelessly transmit a page command to at least one of the wireless sensor nodes. Further, the at least one wireless sensor node may be configured to produce a position indicator upon receipt of the page command.

In another aspect, the present subject matter discloses a system for determining the location of wireless sensors. The system may generally include a plurality of wireless sensor nodes forming at least part of a wireless mesh network. At least one of the wireless sensor nodes is communicatively coupled to at least one of a plurality of sensing devices. Additionally, the system may include a paging device configured to wirelessly transmit a page command across the mesh network to at least one of the wireless sensor nodes. Further, the at least one wireless sensor node may be configured to produce a position indicator upon receipt of the page command.

In a further aspect, the present subject matter discloses a method for determining the location of wireless sensors. The method may generally include generating a page command with a paging device, transmitting the page command to at least one of a plurality of wireless sensor nodes and producing a position indicator in response to the page command. The position indicator may generally provide an indication of the location of the at least one wireless sensor node.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
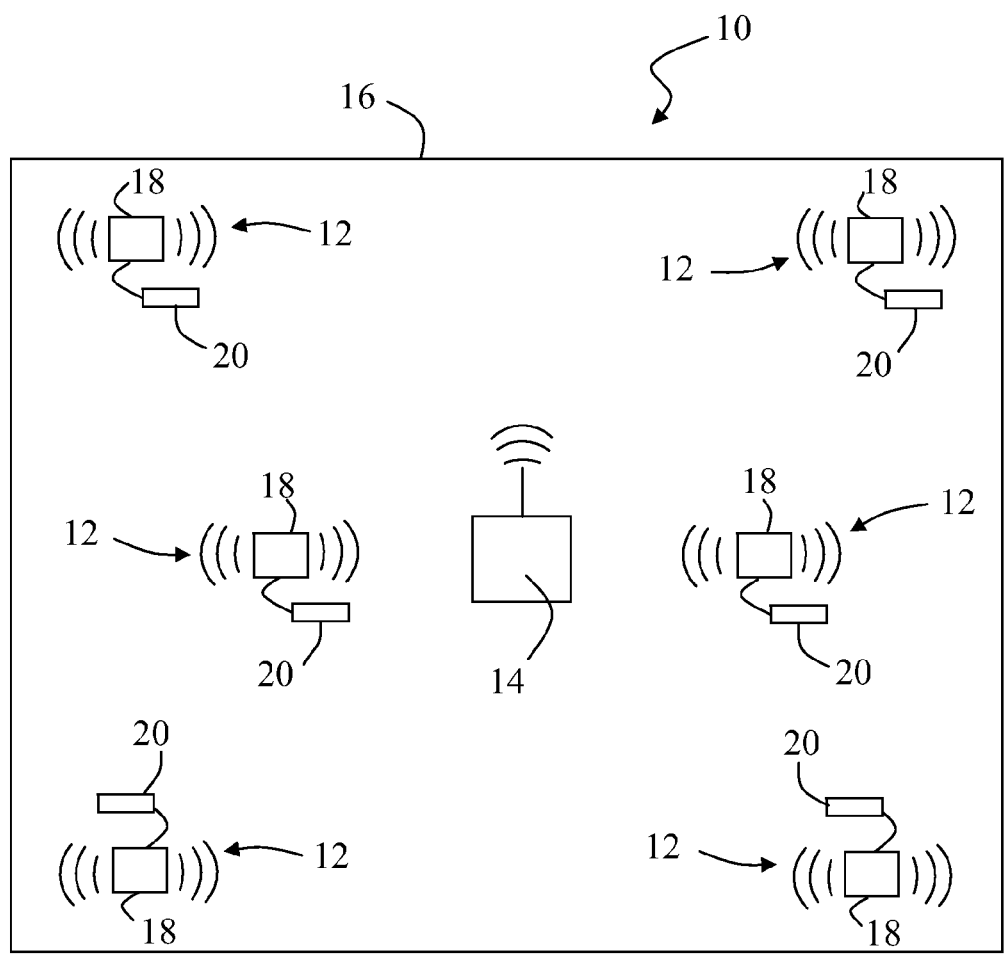
FIG. 1 provides a schematic depiction of one embodiment of a system for locating wireless sensors dispersed throughout an industrial environment in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter generally provides a system for determining the location of wireless devices, such as wireless sensors. For example, in one embodiment, the system may be configured to locate wireless sensors dispersed throughout an industrial environment, such as within a large industrial facility or plant. Specifically, the system may include a paging device configured to wirelessly transmit a page command to one or more of the wireless sensors. In response to the page command, the wireless sensor(s) may be configured to transmit a position indicator, such as an audible tone, flashing light, triangulation signal or preprogrammed position signal, designed to facilitate the identification of the location of the sensors(s) within the industrial environment.

It should be appreciated that, although the present subject matter will be generally described with reference to a system for locating wireless sensors utilized in an industrial environment, the system and methods disclosed herein may be applied across a wide range of other devices and/or applications. For example, the system and methods of the present subject matter may be generally applicable to any wirelessly communicating device used in industrial applications, commercial applications, residential applications or any other suitable application and/or setting.

Referring to the drawings, FIG. 1 illustrates a schematic depiction of one embodiment of a system 10 for determining the location of a plurality of wireless sensors 12. As shown, the system 10 generally includes a paging device 14 configured to wirelessly communicate with one or more of the plurality of wireless sensors 12. In one embodiment, the wireless sensors 12 may be dispersed throughout an industrial environment, such as within a large industrial facility or plant 16. Each wireless sensor 12 generally comprises a wireless sensor node 18 communicatively coupled to one or more sensing devices 20. For example, in one embodiment, the sensing device(s) 20 may be communicatively coupled to each wireless sensor node through a suitable wire or communicative cable 22 (FIG. 2) to permit data received by the sensing device 20 to be transmitted to its corresponding wireless sensor node 18. Alternatively, the sensing devices 20 may wirelessly communicate with corresponding wireless sensor nodes 18 through any suitable wireless communications protocol.

As used herein, the term "sensing device" includes any device capable of monitoring, detecting, sensing, measuring and/or observing the operating conditions of an industrial asset, such as machinery, turbines, mechanical presses, compressors, pumps, motors, blowers, heat exchangers, fans and the like, or any other suitable asset in which information regarding its operating conditions is desired to be obtained. For example, sensing devices 20 may include probes mounted to or disposed within an asset which are configured to monitor, detect, sense, measure and/or observe the vibration, position, speed, timing, temperature, pressure and other operating conditions of the asset. Similarly, sensing devices 20 may also include various types of transducers (e.g., pressure and position transducers), transmitters (e.g., vibration and thrust transmitters) and cameras (e.g., time of flight and infrared cameras) configured to detect, sense, monitor, measure and/or observe the operating conditions of an asset. It should be readily apparent to those of ordinary skill in the art that various other types of sensing devices 20 may be included within scope of the present subject matter which are capable of monitoring, detecting, sensing and/or observing the operating conditions of an asset.

Figure 2:
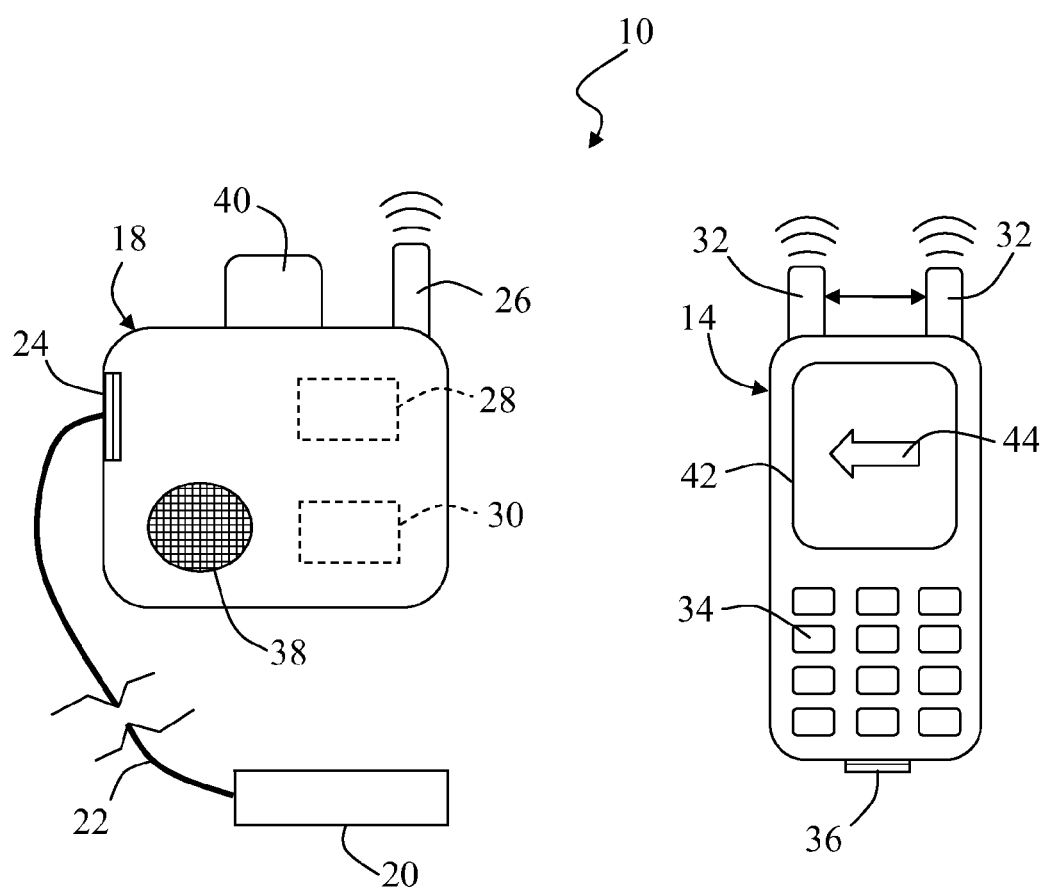
FIG. 2 provides front views of components of the system depicted in FIG. 1, particularly illustrating an embodiment of a wireless sensor and a paging device in accordance with aspects of the present subject matter.

Referring to FIG. 2, embodiments of a wireless sensor node 18 and a paging device 14 of the above described system 10 are illustrated in accordance with aspects of the present subject matter. Each wireless sensor node 18 for the wireless sensors 12 may generally be configured as a wireless sensor interface module. As such, the wireless sensor node 18 may include one or more data input ports 24 for receiving data from the sensing device(s) 20 and an antenna 26 for transmitting and receiving wireless signals. The data input ports 24 may generally comprise any suitable communicative port(s) that permit the transmission of data through any suitable communicative cable or wire 22. For example, the input ports 24 may be configured to accept analogue inputs and/or digital inputs, including parallel and serial digital inputs, from the sensing device(s) 20. The antenna 26 of each wireless sensor node may generally be configured to facilitate wireless communication between a gateway node or sever (not illustrated), another wireless sensor node 18, a wirelessly transmitting sensing device 20 and/or the paging device 14. For instance, the antenna 26 may permit data received from the sensing devices 20 to be wirelessly transmitted to the gateway node or server to enable communication of the data to any suitable databases and/or processing equipment. Thus, it should be appreciated that the antenna 26 may be configured to support one or more of a variety of different radio frequency (RF) or wireless communications protocols including, but not limited to, WI-FI (802.11 b/g), global positioning system (GPS) and ZIGBEE wireless communication protocols.

Each wireless sensor node 18 may also include one or more processor(s) 28 and associated memory element(s) 30 that configure the sensor node 18 to perform a variety of functions, such as data acquisition, signal conditioning and/or processing, data transmission and the like. It should appreciated that, as used herein, the term "processor" need not be limited to integrated circuits referred to in the art as being included in a computer, but broadly refers to a controller, a microcontroller, a microcomputer, a programmable logic controller (PLC), an application specific integrated circuit, and other programmable circuits. Additionally, it should be appreciated the memory element(s) 30 may comprise any suitable type of memory device(s) known in the art including, but not limited to, computer readable medium (e.g., random access memory (RAM), computer readable non-volatile medium (e.g., a flash memory), a floppy disk, a compact disc-read only memory (CD-ROM), a magneto-optical disk (MOD), a digital versatile disc (DVD) and/or other suitable memory device(s).

In one embodiment of the present subject matter, the memory element(s) 30 may be configured to temporarily or permanently store data received from the sensing device(s) 20. Additionally, the memory element(s) 30 may be configured to store computer-readable and executable software instructions designed to be read and executed by processor(s) 28 to create output data (e.g., in the form of RF or wireless communication signals transmitted by the antenna) to permit the data received from the sensing device(s) 20 to be communicated to a suitable peripheral network device. Moreover, in a particular embodiment of the present subject matter, the memory element(s) 30 may also include suitable software instructions that, when implemented by the processors(s) 28 configure the wireless sensor node 18 to receive and process page commands transmitted from the paging device 14. Such software instructions may also configure the wireless sensor node 18 to transmit a position indicator, such as an audible tone, flashing light, triangulation signal or preprogrammed position signal, upon receipt of the page command, as will be described in greater detail below.

Referring still to FIG. 2, the paging device 14 of the present subject matter may generally be configured to transmit a wireless page command to one or more of the wireless sensor nodes. Thus, it should be appreciated the paging device 14 may generally comprise any device capable of communicating wirelessly with other devices via any suitable wireless communications protocol. For example, in a particular embodiment of the present subject matter, the paging device 14 may comprise any suitable WI-FI enabled device, such as a variety of different smart phones, laptop computers, desktop computers, tablet computers, netbooks, mobile computing devices, personal digital assistants and the like. In other embodiments, the paging device 14 may comprise a wireless radio, radio transceiver, portable data collector, cellular or mobile phone, navigation device, or any other known wirelessly communicating device. Additionally, it should be appreciated that the paging device 14 may be configured as a stationary device or as a portable device (e.g., a hand-held device).

Similar to the wireless sensor nodes 18, the paging device 14 may include one or more processor(s) and associated memory element(s) (not illustrated) which permit the storage and implementation of suitable software instructions configuring the paging device 14 to transmit page commands, via one or more antenna(s) 32, to a single wireless sensor node 18 or a group of wireless sensor nodes 18. The page command transmitted by the paging device 14 may generally comprise any wireless signal capable of being received, recognized, and/or processed by the wireless sensor node(s) 18 to which the command is directed. In one embodiment, each of the wireless sensor nodes 18 may be provided with or assigned a unique identifier number, such as a unique Media Access Control (MAC) address. Additionally, the paging device 14 may include input buttons (e.g., an alphanumeric keypad 34), input ports 36 or the like which enable the unique identifier numbers to be inputted into the paging device 14. As such, when it is desired that a particular wireless sensor node(s) 18 be located, the paging device 14 may be configured to transmit a page command embedded with the unique identifier numbers so as to cause only the sensor node(s) 18 having the inputted identifier number(s) to identify its location through the production of a position indicator.

As indicated above, upon receipt of a page command, a wireless sensor node 18 may be configured to produce a position indicator that facilitates the locating of its position within an industrial environment or any other setting in which it is disposed. In one embodiment, the wireless sensor node 18 may be configured to produce an audible alarm upon receipt of the page command transmitted by the paging device 14. For example, as shown in FIG. 2, the wireless sensor node 18 may include an audio device 38 disposed within, mounted onto and/or coupled to the sensor node 18.

In general, the audio device 38 may comprise any suitable device capable of emitting an audible tone or sound. For example, in several embodiments, the audio device 38 may comprise one or more speakers, piezoelectric sound elements, sound transducers and the like. In alternative embodiments, the alarm produced by the audio device 38 may be a continuous sounding alarm or may be a ringing, pulsating and/or beeping alarm. Additionally, it should be appreciated that the alarm may generally be emitted at any suitable Decibel (dB) level that permits such alarm to be heard by the person(s) desiring to locate the wireless sensor node 18. In embodiments in which the system 10 of the present subject matter is being utilized in a large industrial facility or plant 16, it may be desirable for the audio device 38 to be capable of producing an audible alarm at a relatively high dB level to enable the alarm to be heard over any operating machinery and other industrial assets. For instance, the audio device 38 may be configured to emit a tone or sound at a dB level greater than about 70 dB, such as from about 70 dB to about 180 dB, or from about 95 dB to about 140 dB or from about 100 dB to about 120 dB and any other subranges therebetween.

In another embodiment of the present subject matter, the wireless sensor node 18 may be configured to produce visible light upon receipt of the page command transmitted by the paging device. For example, as shown in FIG. 2, the wireless sensor node 18 may include a light source 40 disposed within, mounted onto and/or coupled to the sensor node 18. In various embodiments, light source 40 may comprise one or more electroluminescent lamps, incandescent lamps, gas discharge lamps, high-intensity discharge lamps or any known light source capable of producing perceptible light. In a particular embodiment of the present subject matter, the light source 40 may comprise one or more light emitting diodes (LEDs) configured to emit a flashing, pulsating and/or blinking light.

In a further embodiment of the present subject matter, the wireless sensor node 18 may be configured to transmit a triangulation signal to the paging device 14 upon receipt of the page command. For example, in one embodiment, each wireless sensor node 18 may be configured to transmit a triangulation signal at a predetermined frequency. Thus, when a wireless sensor node 18 receives a page command from the paging device 14 and transmits a responding triangulation signal, the paging device 14 may be configured to recognize the triangulation signal as such based upon the signal frequency. The paging device 14 may then be configured to analyze the signal to determine the relative location and/or direction of the signal's source (i.e., the relative location and/or direction of the transmitting wireless sensor node 18).

To facilitate the determination of the location and/or direction of a wireless sensor node 18 relative to the paging device 14, the paging device 14 may be provided with software instructions that, when implemented, configure the paging device 14 to perform any suitable triangulation and/or localization method/calculation. For example, in the embodiment shown in FIG. 2, the paging device 14 may include a pair of antennas 32 that permit the device 14 to determine the relative location and/or direction of a wireless sensor node 18 based upon the signal strength received by the antennas 32. In particular, by comparing the strength of the triangulation signal transmitted by a wireless sensor node 18 and received by each antenna 32, the paging device 14 may utilize known algorithms and/or equations to determine the direction and/or location of the wireless sensor node 18 relative to the direction at which the paging device 14 is oriented. Alternatively, the dual antenna configuration may permit the paging device 14 to determine the relative location and/or direction of a wireless sensor node based upon the time of flight of the signal. For example, the triangulation signal transmitted by a wireless sensor node 18 may include a time stamp indicating the exact time at which the signal was sent. Thus, by comparing the differences in the signal's time of flight between each antenna 32, the paging device 14 may utilize known algorithms and/or equations to determine the direction and/or location of the wireless sensor node relative to the direction at which the paging device 14 is oriented.

Still referring to FIG. 2, in embodiments in which the location of a wireless sensor node 18 is determined based upon triangulation and/or localization methods/calculations, the paging device 14 may also include a display screen 42 for providing a user of the device 14 a visual indication of the location and/or direction of the sensor node 18. For example, the software instructions stored within the paging device 14 may configure the device 14 to display a visual indicator 44 of the direction of the wireless sensor node 18 desired to be located relative to the orientation of the paging device 14. As shown, the visual indicator 44 may include an arrow or other positional marker that clearly indicates the relative direction of the wireless sensor node 18. It should be appreciated that the display screen may include any suitable display known in the art, such as an organic light emitting display (OLED), light-emitting diode (LED) display, electroluminescent display (ELD), plasma display panel (PDP) or liquid crystal display (LCD). It should also be appreciated that, in embodiments utilizing a triangulation and/or localization method/calculation, it may be particularly desirable for the paging device 14 to be configured as a hand-held or otherwise portable device to permit the device 14 to be transported and/or its orientation altered in response to the visual indicator 44 displayed on the display screen 42.

In yet another embodiment of the present subject matter, the wireless sensor node 18 may be configured to transmit a preprogrammed position signal to the paging device 14 upon receipt of the page command. The preprogrammed position signal may generally comprise any signal that, when received and processed by the paging device 14, identifies the precise or approximate location of the wireless sensor node 18 without requiring the use of a triangulation and/or localization method/calculation. In one embodiment, the preprogrammed position signal may comprise a preprogrammed text string input into the wireless sensor node, such as through one of its data input ports 24, as the sensor node 18 is being initially installed within an industrial facility or plant 16 or other locale. The text string may generally correspond to a textual phrase relating to the position of the wireless sensor node 18. For example, the text string may read "Location: third floor of Building C, on Machine # 123XYZ." Thus, when the paging device 14 transmits a page command to the wireless sensor node 18, the sensor node 18 may respond with the preprogrammed text string. Once received, the text string may be displayed on the display screen 42 of the paging device 14 to permit the location of the wireless sensor node 18 to be known by the user of the device 14.

Figure 3:
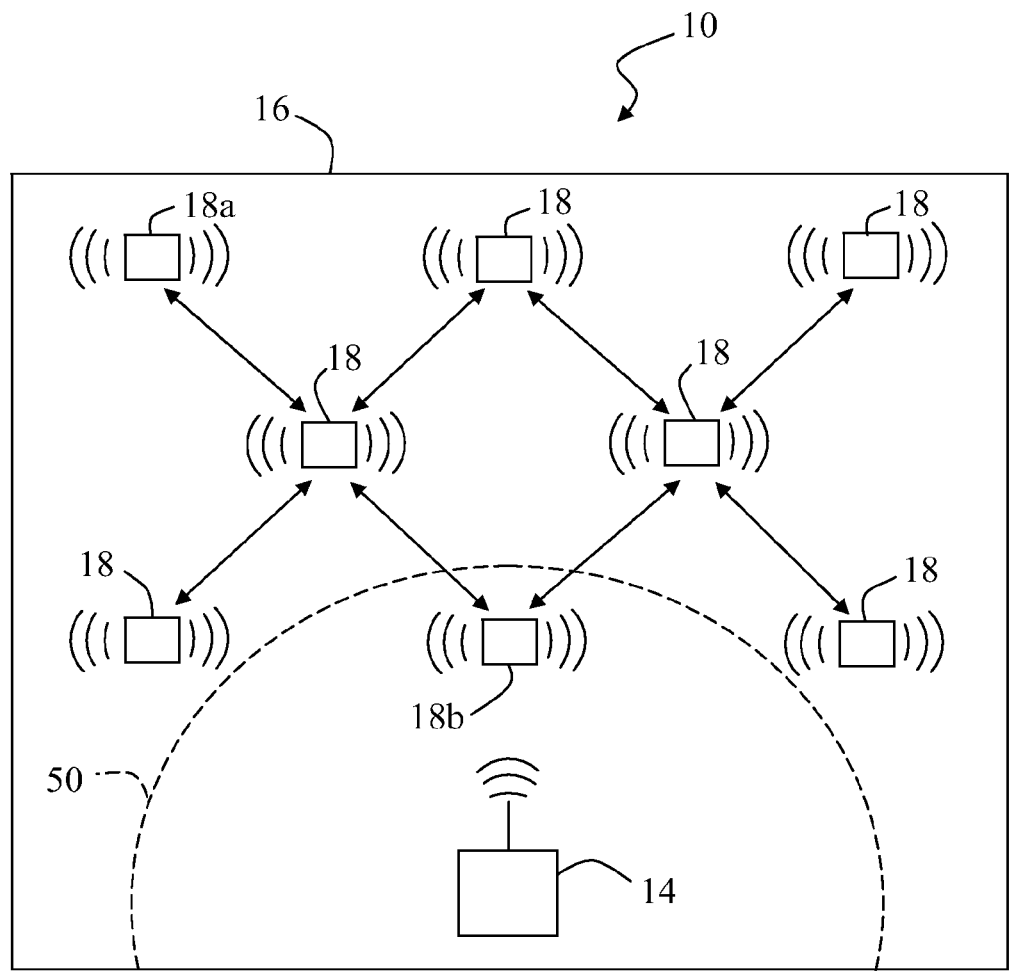
FIG. 3 provides a schematic depiction of an embodiment of a system for locating wireless sensors forming part of a wireless mesh network in accordance with aspects of the present subject matter.

Referring now to FIG. 3, in one embodiment, each of the wireless sensor nodes 18 of the disclosed system may form part of a wireless mesh network. Thus, as shown in FIG. 3, each wireless sensor node 18 may be configured to both transmit and receive signals and/or commands to and from other sensors nodes 18 within its environment. Such a configuration may be particularly advantageous in scenarios in which the wireless sensor nodes 18 and/or the paging device 14 have a limited wireless transmission range. For instance, as shown, the transmission range 50 of the paging device 14 may be limited to a small portion of the industrial facility or plant 16 in which the wireless sensor nodes 18 are disposed. The wireless mesh network, thus, may permit the paging device 14 to transmit page commands to wireless sensor nodes 18 disposed beyond its transmission range. For example, in the illustrated embodiment, if a page command is desired to be transmitted to a particular wireless sensor node 18a, the command transmitted by the paging device 14 may be received by the wireless sensor node(s) 18b within its transmission range 50 and subsequently transmitted through the network to the desired sensor node 18a. Upon receipt of the page command by the desired sensor node 18a, the sensor node 18a may then produce any suitable position indicator to alert a user of the system to its position. Additionally, in embodiments in which the wireless sensor node 18 to be located is configured to transmit a triangulation signal and/or preprogrammed position signal upon receipt of the page command, the triangulation and/or position signal may similarly be sent through the wireless mesh network to ensure that the signal is transmitted to the paging device 14.

It should be appreciated that the wireless sensor nodes 18 of the present subject matter may generally be configured to implement any suitable mesh network technology known in the art. For example, each of the wireless sensor nodes 18 may be provided with suitable software instructions that enable the sensor nodes 18 to perform dynamic routing, thereby permitting the sensor nodes 18 to automatically select the quickest and most efficient path to transmit information across the network from one location to another. Additionally, the mesh network may be designed to be self-forming, meaning that a newly added wireless sensor node 18 may be automatically detected and added to the network. Further, the wireless sensor nodes 18 may generally be configured to implement any suitable routing protocol known in the art for routing information across the network, such as the ZIGBEE protocol, the Ad-Hoc Configuration Protocol (AHCP) or the Dynamic WMN Configuration Protocol (DWCP).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for determining the location of wireless sensors, the system comprising:
a plurality of wireless sensor nodes, at least one of the plurality of wireless sensor nodes being communicatively coupled to at least one of a plurality of sensing devices and comprising an audio device, the sensing devices being configured to monitor at least one operating condition of an industrial asset; and
a paging device configured to wirelessly transmit a page command to at least one of the plurality of wireless sensor nodes, wherein the at least one of the plurality of wireless sensor nodes is configured to produce a position indicator upon receipt of the page command by emitting an audible alarm from the audio device, wherein the position indicator provides an indication of the location of the at least one of the plurality of wireless sensor nodes.

2. The system of claim 1, wherein the audio device comprises at least one of a speaker and a piezoelectric sound element.

3. The system of claim 1, wherein the audible alarm is emitted at a Decibel level ranging from 70 dB to 180 dB.

4. The system of claim 1, wherein the position indicator comprises a visible light, the at least one of the plurality of wireless sensor nodes including a light source configured to emit the visible light upon receipt of the page command.

5. The system of claim 1, wherein the position indicator comprises a triangulation signal, the paging device being configured to determine the relative location of the at least one of the plurality of wireless sensor nodes based upon the triangulation signal.

6. The system of claim 5, wherein the paging device comprises a pair of antennas, the paging device being configured to determine the relative location of the at least one of the plurality of wireless sensor nodes by comparing at least one of the time of flight and the signal strength of the triangulation signal received by each of the antennas.

7. The system of claim 5, wherein the paging device comprises a display screen configured to display a visual indicator of the relative location of the at least one of the plurality of wireless sensor nodes.

8. The system of claim 1, wherein the position indicator comprises a preprogrammed position signal, the at least one of the plurality of wireless sensor nodes being configured to transmit the preprogrammed position signal to the paging device upon receipt of the page command.

9. The system of claim 8, wherein the preprogrammed position signal comprises a preprogrammed text string.

10. A method for determining the location of a wireless sensor, the method comprising:
generating a page command using a paging device;
transmitting the page command to at least one of a plurality of wireless sensor nodes, the at least one of the plurality of wireless sensor nodes being communicatively coupled to at least one of a plurality of sensing devices, the sensing devices being configured to monitor at least one operating condition of an industrial asset; and
producing a position indicator at the wireless sensor node upon receipt of the page command by emitting an audible alarm from an audio device of the at least one of the plurality of wireless sensor nodes, wherein the position indicator provides an indication of the location of the at least one of the plurality of wireless sensor nodes.

11. The method of claim 10, wherein producing the position indicator upon receipt of the page command comprises emitting a visible light from a light source of the at least one of the plurality of wireless sensor nodes.

12. The method of claim 10, wherein producing the position indicator upon receipt of the page command comprises transmitting a triangulation signal from the at least one of the plurality of wireless sensor nodes to the paging device.

13. The method of claim 10, wherein producing the position indicator upon receipt of the page command comprises transmitting a preprogrammed position signal from the at least one of the plurality of wireless sensor nodes to the paging device.

14. The method of claim 10, further comprising inputting a unique identifier number of the at least one of the plurality of wireless sensor nodes into the paging device.

15. The method of claim 14, wherein generating the page command with the paging device comprises generating a page command including the unique identifier number of the at least one of the plurality of wireless sensor nodes, the unique identifier number comprising a Media Access Control address.

16. A system for locating a wireless sensor node, the system comprising:
a paging device configured to transmit a page command signal to the wireless sensor node;
at least one sensing device configured to monitor an operation parameter of an industrial asset; and
a wireless sensor node communicatively coupled to the at least one sensing device, the wireless sensor node having an audio device, a memory element, and a preprogrammed position signal stored in the memory element, the wireless sensor node being configured to receive the page command signal from the paging device and to transmit the preprogrammed position signal back to the paging device in response to the page command signal and to produce a position indicator by emitting an audible alarm from the audio device, wherein the preprogrammed position signal comprises a text string configured to indicate a precise location of the wireless sensor node in response to the paging command signal.

17. The system of claim 16, wherein the paging device comprises a display and is configured to display a visual indicator on the display to indicate a relative direction to the wireless sensor from the paging device.

18. The system of claim 16, wherein the precise location indicates a machine on which the wireless sensor is connected.

* * * * *